March 25, 1924.

C. E. WHITE

ILLUMINATING DEVICE FOR MOTOMETERS

Filed Sept. 19, 1922

1,488,454

WITNESSES

INVENTOR
Clarence E. White
BY
ATTORNEYS

Patented Mar. 25, 1924.

1,488,454

UNITED STATES PATENT OFFICE.

CLARENCE E. WHITE, OF NEW YORK, N. Y.

ILLUMINATING DEVICE FOR MOTOMETERS.

Application filed September 19, 1922. Serial No. 589,123.

*To all whom it may concern:*

Be it known that I, CLARENCE E. WHITE, a citizen of the United States, and a resident of the city of New York, Elmhurst, borough of Queens, in the county of Queens and State of New York, have invented new and useful Improvements in Illuminating Devices for Motometers, of which the following is a full, clear, and exact description.

This invention relates to illuminating devices for motometers.

In the construction of motometers considerable difficulty has been experienced in providing means for illuminating the thermometer so that it may be read at night. Unless the proper illuminating means are provided the motometer does not meet the requirements of the user.

The general object of this invention is the provision of a simple and efficient device for so illuminating the thermometer of a motometer that it may be easily read at night.

This object is accomplished by providing two spring members of semicircular shape, having straight faces for mounting in the motometer casing with the straight faces next and parallel to the thermometer, and superimposing on the straight faces a layer of luminous material for projecting light onto the thermometer at approximately right angles to the line of vision.

These and other objects of the invention will be more clearly understood from the following detailed specification and accompanying drawings.

Figure 1:
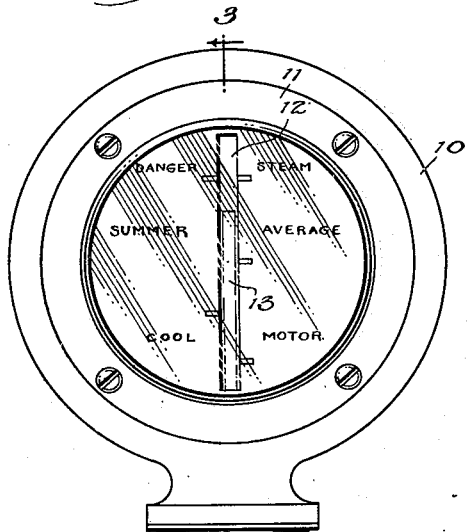
Figure 1 is a front elevation of a motometer.
Figure 2:
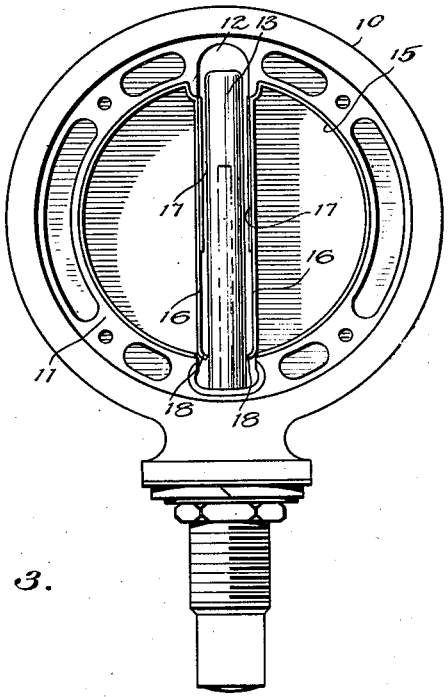
Figure 2 is a front elevation of a motometer with the front plate removed showing the illuminating device in position.
Figure 3:
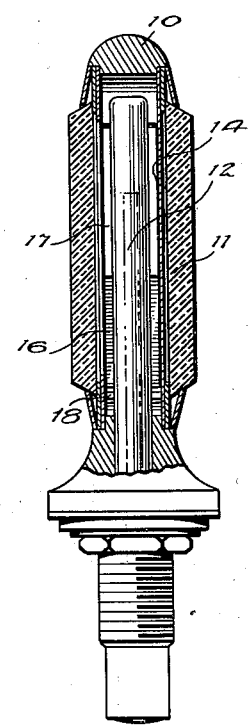
Figure 3 is a vertical section along the line 3—3, Figure 1.
Figure 4:
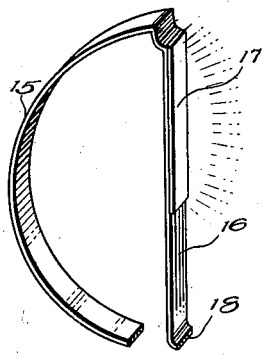
Figure 4 is a perspective view of one of the illuminating members.

Referring to the above-mentioned drawings, a motometer assemblage 10 is shown. This assemblage 10 includes a casing 11, in the front and rear walls of which vertical slots 12 are provided. These slots are opposite one another and a thermometer 13 is located between the walls in alinement with the slots 12. The above description sets forth the general construction of motometers that have been in use for a number of years.

In order to illuminate the thermometer the slot in the rear wall has been closed and a layer of luminous material superimposed on the wall behind the thermometer, but this has not proved very satisfactory.

In the construction of this illuminating device, the slot 12 in the rear wall is closed by a sheet of tin foil 14 or other suitable material. Two semicircular spring members including curved portions 15 and straight portions 16 for removably mounting in the casing one on each side of the thermometer, are provided. In the upper half of each face presented by the straight portions 16 layers of luminous material 17 are superimposed. These luminous layers project light onto the thermometer at approximately right angles to the line of vision. This projecting of light onto the thermometer from the sides and providing a reflector behind the thermometer proves very efficient. In order to retain the straight portions 16 spaced from the thermometer 13, projections 18 which engage it are provided.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims.

1. In combination with a motometer including a casing having slotted walls and a thermometer visible through the slots mounted in the casing, an illuminator comprising luminous plates located in the casing and extending at right angles to the slotted walls.

2. In combination with a motometer including a casing having a thermometer mounted therein visible through slots provided in the walls of the casing, an illuminating device comprising luminous plates located in the casing extending parallel to the thermometer and at right angles to the slotted walls.

3. In combination with a motometer including a casing having slotted walls and a thermometer visible through the slots mounted in the casing, an illuminating device comprising luminous plates located in the casing and extending approximately parallel to the line of vision.

4. In combination with a motometer including a casing having slots cut therein and a thermometer mounted in the casing in line with said slots, means for illuminating the thermometer comprising semicircular members presenting straight sides mounted in the casing with the straight sides parallel to the thermometer, and layers of luminous material for illuminating the thermometer superimposed on said sides.

5. In combination with a motometer including a casing having a vertical slot in both front and rear walls and a thermometer mounted in alinement with said slots, a device for illuminating the thermometer comprising two semicircular spring members each having a straight face for mounting in the casing one on each side of the thermometer, a layer of luminous material provided on the straight face of each spring member, means for retaining the straight faces spaced from the thermometer, and means located behind the thermometer for reflecting light.

CLARENCE E. WHITE.